UNITED STATES PATENT OFFICE.

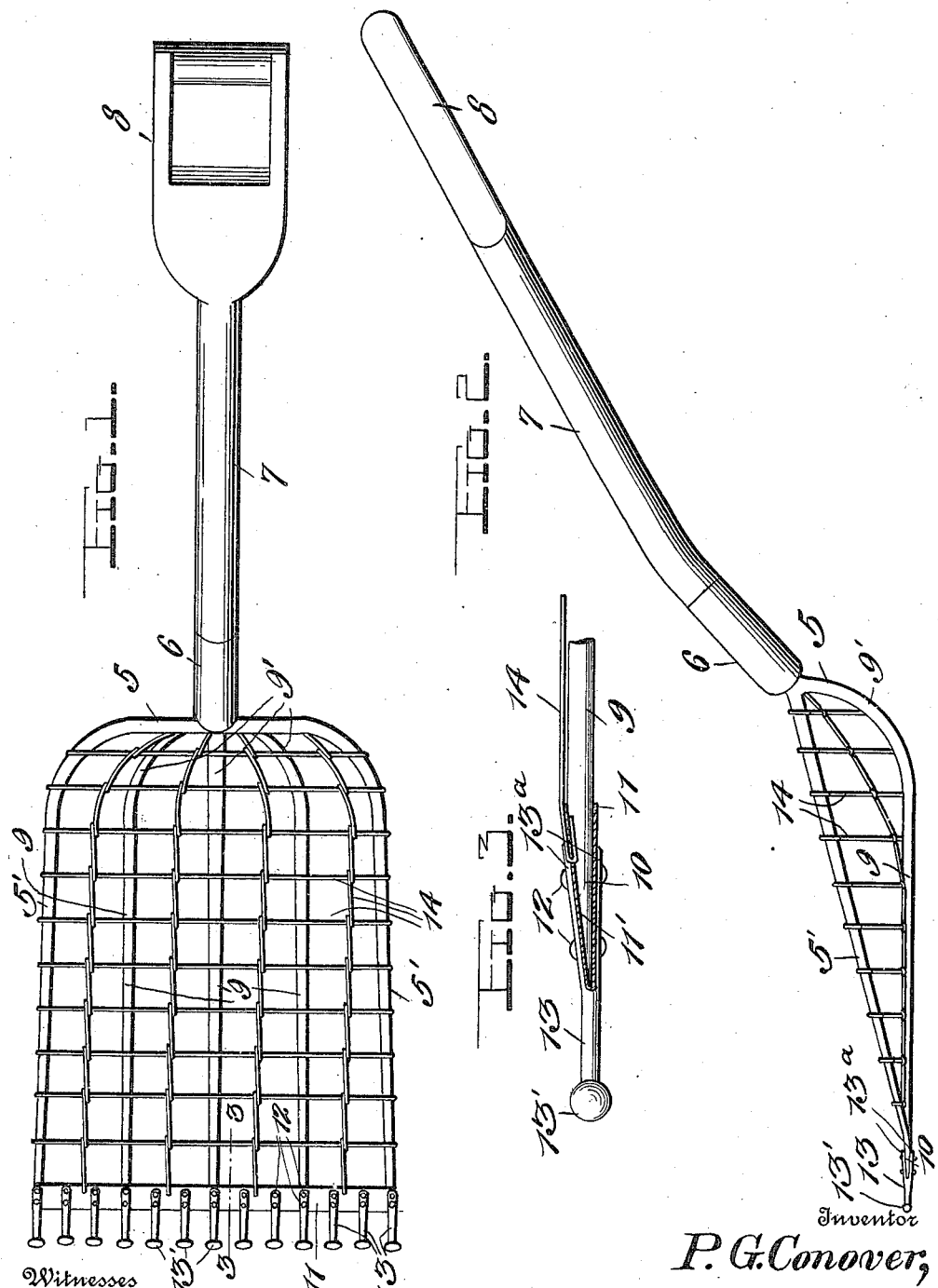

PETER G. CONOVER, OF DENVER, COLORADO.

AGRICULTURAL IMPLEMENT.

985,568.  Specification of Letters Patent.  Patented Feb. 28, 1911.

Application filed November 12, 1910.  Serial No. 592,054.

*To all whom it may concern:*

Be it known that I, PETER G. CONOVER, a citizen of the United States, residing at Denver, in the county of Denver and State of Colorado, have invented certain new and useful Improvements in Agricultural Implements, of which the following is a specification, reference being had to the accompanying drawings.

This invention relates to agricultural implements and has for its object to provide a hand implement for digging and assorting potatoes or similar vegetables of that character which mature beneath the ground surface.

A further object of the invention resides in the provision of a very novel and simple device of the above character whereby the potatoes may be easily and quickly removed from the ground without danger of injury to the same, the implement being so constructed as to permit of the rapid assortment of the potatoes in accordance with their different sizes.

A still further object of the invention is to provide an implement which may be constructed at a very low cost, which is extremely strong and durable and which is admirably adapted for the purpose in view.

With the above and other objects in view, the invention consists of the novel features of construction, combination and arrangement of parts hereinafter fully described and claimed, and illustrated in the accompanying drawings, in which—

Figure 1 is a plan view of a potato digging and assorting implement embodying my improvements; Fig. 2 is a side elevation thereof; and Fig. 3 is an enlarged detail section taken on the line 3—3 of Fig. 1.

Referring in detail to the drawing 5 designates the boundary rod of a frame which is in the general form of a shovel. This boundary member is formed from a heavy steel rod which is bent into substantially U-shaped form as shown in Fig. 1. The intermediate portion of this frame member is curved and disposed above the plane of the diverging end portions 5' thereof. These portions gradually taper to their extremities, the intermediate portion of the frame member which sustains the greatest strain being appreciably greater in diameter and consequently heavier. The central transverse portion of the frame member 5 is formed with or has secured thereto in any convenient manner, a sleeve 6. This sleeve receives the reduced end portion of a shank 7 on the other end of which a suitable hand grip 8 is formed.

A plurality of intermediate tines 9 are arranged between the longitudinally disposed portions 5' of the outer frame member 5 and are curved at one end as shown at 9' and suitably fixed to the central portion of the frame member 5. I have shown in the accompanying drawing three such intermediate tines, though it will be obvious that if desired a greater or less number may be employed in the construction of the implement. The extremities of the tapering ends 5' of the boundary frame rod and of the tines 9 have their upper surfaces beveled as designated at 10, and a sheet metal plate 11 extends transversely beneath the same and is bent over upon the beveled surfaces 10 as indicated at 11'. This plate is rigidly secured upon the ends of the tines by means of the rivets 12, said rivets also securing upon said plate a plurality of outwardly extending fingers 13. These fingers each consist of a shank having a spherical head 13' formed on one end, the other end of said shank being expanded and bifurcated as shown at 13$^a$ to receive the transverse plate 11. In this manner the ends of the tines are rigidly connected and braced thereby preventing injury to the same by encountering stones or other hard objects beneath the ground surface. The spherical ends 13' of the fingers also eliminate all liability of injury to the potatoes when the implement is inserted beneath the plant.

A wire mesh 14 is arranged upon the frame rod 5 and extends over the intermediate tines 9. The ends of the transverse stands of the mesh are secured upon the boundary frame rod 5 while the longitudinal strands are bent around the transverse strands and suitably secured at one end to the plate 11 and at their other ends to the intermediate portion of the rod 5.

In the use of my improved implement, the fingers 13 are forced into and below the ground surface at approximately the proper point to dispose the spherical ends thereof beneath the potatoes or other vegetables. A downward pressure is now exerted upon the shank 7 to lift or elevate the earth and potatoes contained in the scoop or shovel-shaped body of the implement. By agitating the contents, the earth may be sifted through the wire mesh and the potatoes which are retained therein may be conveniently assorted and placed into separate receptacles for containing potatoes of the same size. In this manner the potatoes may be very quickly dug up and assorted, the spherical ends of the fingers 13 effectually preventing any injury to the same. Moreover, my improved implement may be constructed at a very low cost, is extremely strong and durable in practical use and is highly efficient for the purpose specified.

While I have above described and shown the preferred construction of the invention, it will be understood that the device is susceptible of considerable modification without departing from the essential feature or sacrificing any of the advantages thereof.

Having thus described the invention what is claimed is:—

1. An implement of the character described comprising a substantially rectangular scoop-shaped body having a handle secured thereto, said body consisting of a plurality of spaced tines, a transverse plate having an intermediate longitudinal bend therein and disposed upon opposite sides of the extremity of the tines, and a plurality of longitudinally disposed fingers bifurcated at one of their ends to receive said transverse plate, and fastening rivets extending through said fingers, the ends of the tines and said plate to rigidly secure the same together.

2. An implement of the character described comprising a body consisting of a boundary frame rod having a curved intermediate portion, a plurality of longitudinally disposed tines arranged between the end portions of said rod and secured to its central portion, reticulated material arranged over the tines and secured to the boundary rod, an operating handle secured to the intermediate portion of said rod, and a plurality of longitudinally disposed fingers extending beyond the extremities of said rod and the tines.

3. An implement of the character described comprising a body consisting of a plurality of longitudinally disposed tines, reticulated material arranged upon said tines, the extremities of said tines having beveled surfaces, a transverse plate extending beneath the extremities of the tines and bent over upon the beveled surfaces thereof, and a plurality of longitudinally disposed fingers bifurcated at one of their ends to receive said plate and rigidly secured thereto, the outer ends of said fingers being spherically formed.

In testimony whereof I hereunto affix my signature in the presence of two witnesses.

PETER G. CONOVER.

Witnesses:
W. O. KUTSCHE,
WM. STEWARDSON.

---

Copies of this patent may be obtained for five cents each, by addressing the "Commissioner of Patents, Washington, D. C."